United States Patent
Veit et al.

(10) Patent No.: US 10,274,026 B2
(45) Date of Patent: Apr. 30, 2019

(54) FREEWHEEL AND FREEWHEEL ARRANGEMENT COMPRISING SUCH A FREEWHEEL

(71) Applicant: BorgWarner Inc., Auburn Hills, MI (US)

(72) Inventors: Matthias Gerhard Veit, Oftersheim (DE); Marcus Thomas Hertel, Bruchsal (DE); Dirk Achim Schmitt, Leimen (DE); Kay Rapp, Ladenburg (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/338,679

(22) Filed: Oct. 31, 2016

(65) Prior Publication Data

US 2017/0122386 A1    May 4, 2017

(30) Foreign Application Priority Data

Oct. 31, 2015    (DE) .................. 10 2015 014 029

(51) Int. Cl.
*F16D 41/06*     (2006.01)
*F16D 41/066*    (2006.01)
(Continued)

(52) U.S. Cl.
CPC ......... *F16D 41/066* (2013.01); *F02N 15/023* (2013.01); *F02N 15/025* (2013.01); *F16D 41/067* (2013.01); *F16D 2041/0605* (2013.01)

(58) Field of Classification Search
CPC ................ F16D 41/066; F16D 41/067; F16D 2041/0605
(Continued)

(56) References Cited

U.S. PATENT DOCUMENTS 1,820,151 A * 8/1931 Mullen ................ F16D 41/066
                                              192/45.02
1,942,198 A * 1/1934 Blackstock ........... F16D 41/088
                                              192/31
(Continued)

FOREIGN PATENT DOCUMENTS

DE    10 2013 012 804 A1    2/2015

OTHER PUBLICATIONS

English language abstract for DE 10 2013 012 804 extracted from espacenet.com database on Dec. 15, 2016, 1 page.

*Primary Examiner* — David R Morris
(74) *Attorney, Agent, or Firm* — Howard & Howard Attorneys PLLC

(57) ABSTRACT

Disclosed is a freewheel (4) comprising a first race (38), a second race (40), a clamping gap (46) designed between the first and second race (38, 40), at least one clamping element (48) in the clamping gap (46), and biasing feature (64) for biasing the clamping element (48) into a clamping position within the clamping gap (46), wherein the biasing feature (64) have an accordion spring (66), which is supported directly or indirectly on the first race (38) and which comprises corrugation peaks (70) lying radially outward, corrugation troughs (72) lying radially inward, and a support leg (76) for direct or indirect support on the clamping element (48). In addition, disclosed is a freewheel arrangement (2) comprising such a freewheel (4).

18 Claims, 6 Drawing Sheets

(51) Int. Cl.
*F02N 15/02* (2006.01)
*F16D 41/067* (2006.01)

(58) Field of Classification Search
USPC .......................................... 192/45.02, 45.016
See application file for complete search history.

(56) References Cited

U.S. PATENT DOCUMENTS

| | | | | | |
|---|---|---|---|---|---|
| 1,955,698 | A | * | 4/1934 | Bushong | F16D 23/02 192/45.02 |
| 2,069,558 | A | * | 2/1937 | Rauen | F16D 41/064 192/45.017 |
| 2,211,053 | A | * | 8/1940 | Critchfield | F02N 15/023 192/45.02 |
| 2,902,125 | A | * | 9/1959 | House | F02N 15/023 192/45.019 |
| 2,973,847 | A | * | 3/1961 | Stockton | F16D 41/067 192/45.016 |
| 3,750,782 | A | * | 8/1973 | Costantini | F16D 41/066 192/42 |
| 3,965,754 | A | * | 6/1976 | Bowcott | F02N 15/023 192/45.018 |
| 4,415,072 | A | * | 11/1983 | Shoji | F16D 41/066 192/45.007 |
| 6,796,413 | B2 | * | 9/2004 | Fukui | F16D 41/07 192/42 |
| 6,920,969 | B2 | * | 7/2005 | Ishizaka | F16D 41/066 188/82.84 |
| 8,459,424 | B2 | * | 6/2013 | Altmann | F16D 41/067 192/45.016 |
| 8,668,623 | B2 | * | 3/2014 | Vuksa | F16H 9/18 477/174 |
| 8,910,764 | B2 | * | 12/2014 | Parameswaran | F16D 15/00 192/110 B |
| 9,611,901 | B2 | * | 4/2017 | Bastel | F16D 41/06 |
| 9,624,989 | B2 | * | 4/2017 | Baeumler | F02N 15/023 |
| 9,638,269 | B2 | * | 5/2017 | Boelling | F16D 41/064 |
| 9,726,235 | B2 | * | 8/2017 | Baeumler | F16D 41/064 |
| 2003/0085092 | A1 | * | 5/2003 | Fukui | F16D 41/07 192/45.02 |
| 2004/0089510 | A1 | * | 5/2004 | Ishizaka | F16D 41/066 192/45.02 |
| 2011/0092325 | A1 | * | 4/2011 | Vuksa | F16H 9/18 474/14 |
| 2012/0000741 | A1 | * | 1/2012 | Altman | F16D 41/067 192/45.019 |
| 2013/0126290 | A1 | * | 5/2013 | Parameswaran | F16D 15/00 192/45.001 |
| 2015/0034442 | A1 | | 2/2015 | Baeumler | |
| 2015/0114783 | A1 | * | 4/2015 | Baeumler | F02N 15/023 192/45.018 |
| 2015/0136557 | A1 | * | 5/2015 | Bastel | F16D 41/06 192/42 |
| 2015/0159707 | A1 | * | 6/2015 | Boelling | F16F 15/124 192/45.003 |
| 2017/0058970 | A1 | * | 3/2017 | Schneider | F16D 41/066 |
| 2017/0211637 | A1 | * | 7/2017 | Boelling | F16D 41/06 |
| 2017/0284480 | A1 | * | 10/2017 | Veit | B21K 1/30 |

* cited by examiner

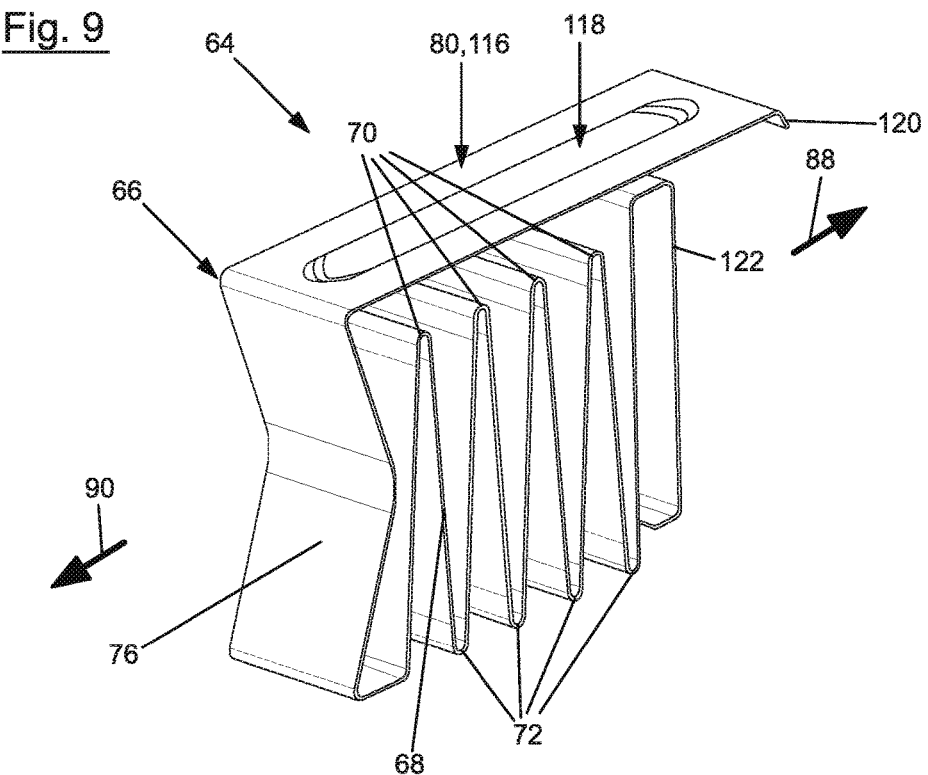
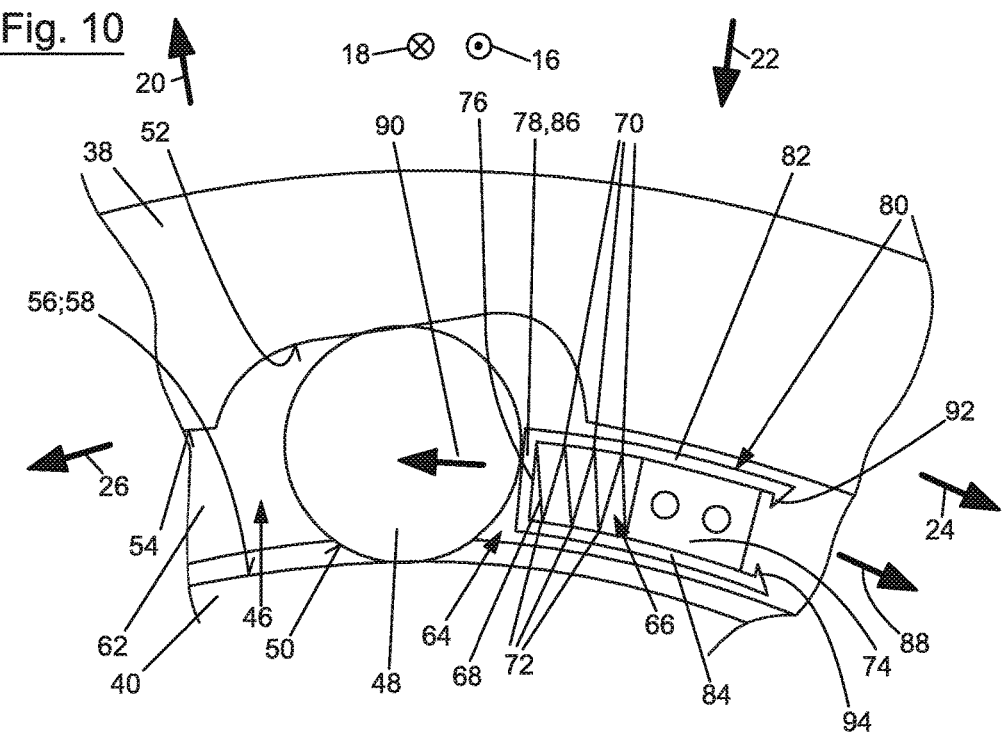

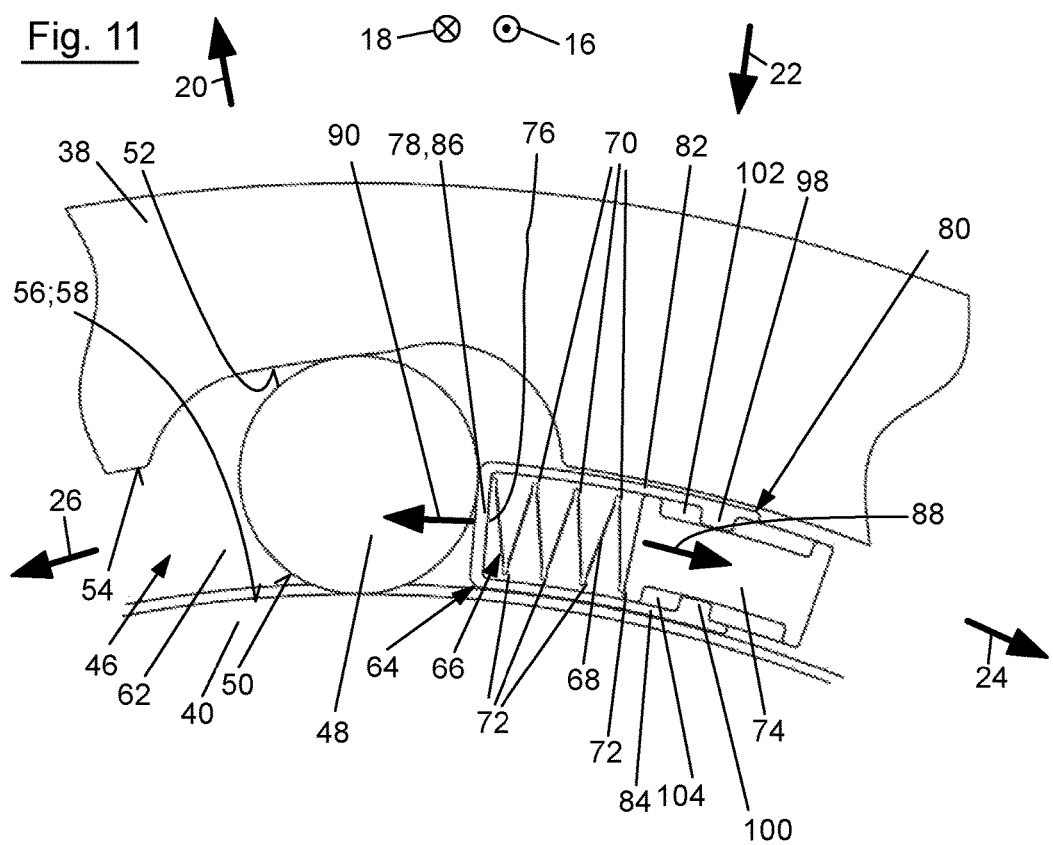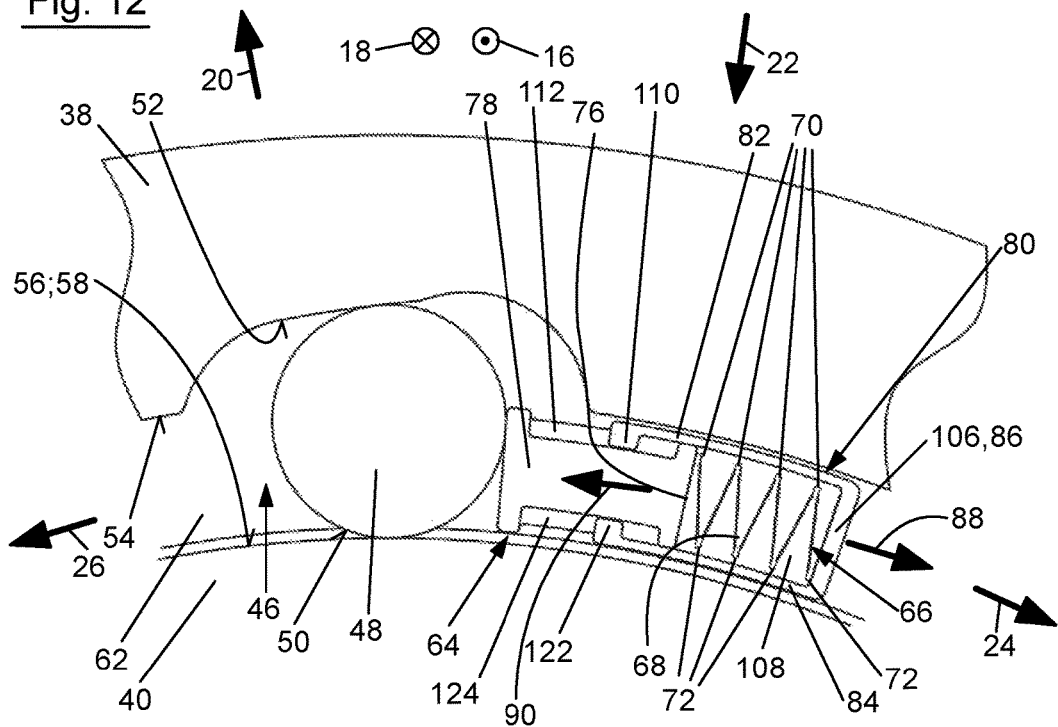

FREEWHEEL AND FREEWHEEL ARRANGEMENT COMPRISING SUCH A FREEWHEEL

CROSS-REFERENCE TO RELATED APPLICATIONS

This application claims the benefit of German Patent Application No. 102015014029.9 filed Oct. 31, 2015, the disclosure of which is herein incorporated by reference in its entirety.

DESCRIPTION

The present invention relates to a freewheel comprising a first race, a second race, and a clamping gap designed between the first and second race, at least one clamping element in the clamping gap, and biasing means for biasing a clamping element into a clamping position within the clamping gap, wherein the biasing means have an accordion spring, which is supported directly or indirectly on the first race and which comprises corrugation peaks lying radially outward and corrugation troughs lying radially inward and a support leg for direct or indirect support on the clamping element. In addition, the present invention relates to a freewheel arrangement with a freewheel of this type.

A freewheel is known from DE 10 2013 012 804 A1 which has a first race in the form of an outer ring and a second race in the form of an inner ring, wherein a clamping gap is designed in the radial direction between the first and second race. At least one clamping element, in this case in the form of a clamping roller, is arranged within the clamping gap. The clamping element in the form of the clamping roller can be moved into a clamping position within the clamping gap, wherein biasing means are provided for biasing the clamping element into the clamping position within the clamping gap. The biasing means in the known freewheel comprise an accordion spring. The accordion spring is supported or fixed directly on the first race in a circumferential direction, wherein a radial projection is provided for this purpose on the side of the first race facing radially inward, via which projection the accordion spring is also fixed on the first race. In addition, the accordion spring has, due to the corrugated form thereof, corrugation peaks lying radially outward and corrugation troughs lying radially inward. In addition, the accordion spring has a support leg on an end for direct support of the accordion spring on the clamping element in the form of a clamping roller. Biasing means comprising an accordion spring have proven advantageous in freewheels due to their thin shape, the clamping gap thus has a low axial extension, however, a relatively large radial extension, particularly as an accordion spring can be arranged herein relatively easily and in a space-saving way, and additionally can apply the necessary spring force. However, it has been shown that an accordion spring can relatively easily buckle or deflect in the radial direction, which can lead to a disadvantageous operating behavior of the freewheel. In the freewheel known from DE 10 2013 012 804 A1, the radially outward lying corrugation peaks of the accordion spring are therefore supported outwardly on a side of the first race facing inward in the radial direction. However, this causes a structural limitation with respect to the inward facing side of the first race, in particular to the radially inward facing raceway of the first race, along which the clamping element moves in the form of a clamping roller. The arrangement of the accordion spring within the clamping gap is also subjected to narrow boundaries due to this. If, in addition, a larger spring path of the accordion spring is necessary, then at least the corrugation peaks adjacent to the support legs are no longer supportable at the first race in the radially outward direction, due to which the previously mentioned buckling and deflection behavior of the accordion spring deteriorates. It has also been shown that the accordion spring in the known solution can be exposed to an increased wear, such that at times the function of the accordion spring can be limited over the lifecycle of the freewheel.

It is therefore an object of the present invention to create a freewheel comprising a biasing means having an accordion spring, the biasing means guarantee a good buckling or deflection behavior of the accordion spring, a flexible arrangement of the same within the clamping gap, and a low wear of the same in order to ensure the function of the accordion spring over the lifecycle of the freewheel. In addition, the underlying object of the invention is to create a freewheel arrangement for a motor vehicle comprising such an advantageous freewheel.

This problem is solved by the features listed in Claim 1 or 15. Advantageous embodiments of the invention are the subject matter of the subclaims.

The freewheel according to the invention has a first race, a second race, and a clamping gap designed between the first and second race, in which clamping gap at least one clamping element is arranged. The first race may be, for example, an outer ring or an inner ring, whereas the second race may be an inner ring or an outer ring so that the clamping gap would be arranged between the corresponding outer and inner ring in the radial direction. The clamping element may be, for example, a clamping roller, a clamping body, or a pawl. However, it is hereby preferred if the clamping element is designed as a clamping roller, wherein the ratio between a width and an outer diameter of such a clamping roller is then particularly preferably less than or equal to 1:3, less than or equal to 1:4, or less than or equal to 1:5, in order to create a clamping roller with a low axial extension, consequently also a clamping gap and a freewheel with a particularly low axial spatial requirement. The clamping element may, as in known freewheels, in particular the freewheel according to DE 10 2013 012 804 A1, be moved into a clamping position within the clamping gap, wherein biasing means are provided for biasing the clamping element into the clamping position within the clamping gap. The biasing means have an accordion spring supported directly or indirectly on the first race, preferably in a circumferential direction. The accordion spring has preferably in this case a longitudinally extended spring base body, which extends in a radial plane and has a corrugated type progression in the radial direction. In each case, the accordion spring has corrugation peaks lying radially outward, corrugation troughs lying radially inward, and a support leg for direct or indirect support of the accordion spring on the clamping element within the clamping gap. In contrast to the biasing means according to DE 10 2013 012 804 A1, the biasing means in the freewheel according to the invention are not reduced to a single accordion spring, but instead the biasing means additionally have a spring support element. At least one of the corrugation peaks of the accordion spring is supported or supportable outwardly in the radial direction on the spring support element. Alternatively or supplementally, the spring support element is designed or arranged in such a way that at least one of the corrugation troughs is supported or supportable inwardly in the radial direction on the spring support element. By this means, the buckling and deflection behavior of the accordion spring is improved, which in particular reduces the load and the wear of the accordion spring so that the function thereof is guaranteed over the lifecycle of the freewheel. An improved operating behavior may also be achieved by this means. In addition, by using a spring support element on which at least one of the corrugation peaks is supported or supportable outwardly in the radial direction and/or at least one of the corrugation troughs is supported or supportably inwardly in the radial direction, the necessity for supporting the corrugation peaks or corrugation troughs directly on one of the races is omitted, as this is the case, for example, in DE 10 2013 012 804 A1. By this means, it is possible to have not only a more flexible arrangement of the biasing means within the clamping gap and a more flexible configuration of at least one of the two races, but also the risk of higher wear on the corresponding race and the accordion spring is reduced, particularly as the at least one corrugation peak or the at least one corrugation trough is radially supported or supportable via the spring support element. In this context, a spring support element has proven particularly advantageous if the material thereof has a lower hardness than the material of the race and/or a lower hardness than the material of the accordion spring. It is also preferred if the spring support element is designed separately from the races, consequently it is not designed as one piece with one of the races.

In a preferred embodiment of the freewheel according to the invention, the at least one corrugation peak supported or supportable outwardly in the radial direction on the spring support element is that corrugation peak which is arranged adjacent to the support leg. In this way, it is guaranteed that a support of the accordion spring, which then again improves the buckling and deflection behavior, is provided outward in the radial direction, if relatively long accordion springs are used in which, for example, a direct support or supportability at one of the races is not possible or is not completely guaranteed.

In one embodiment of the freewheel according to the invention as an alternative or supplement to the previously described embodiment, two or more corrugation peaks, in particular at least the corrugation peaks directly following one another on the side of the accordion spring facing the clamping element, particularly preferably all corrugation peaks of the accordion spring, are supported or supportable outwardly in the radial direction on the spring support element in order to improve the buckling and deflection behavior of the accordion spring.

Analogous to the two previously described embodiments of the freewheel, the at least one corrugation trough, which is supported or supportable inwardly in the radial direction on the spring support element in another preferred embodiment of the freewheel according to the invention, is that corrugation trough which is adjacent to the support leg of the accordion spring. With respect to the advantages, reference is made hereby to the advantages of the preceding embodiment, which correspondingly apply.

In another preferred embodiment of the freewheel according to the invention, which provides an alternative or supplement to the previously described embodiment, two or more corrugation troughs, preferably corrugation troughs directly following one another on the side of the accordion spring facing the clamping element, particularly preferably all corrugation troughs, are supported or supportable inwardly in the radial direction on the spring support element in order to improve the buckling and deflection behavior of the accordion spring.

In an advantageous embodiment of the freewheel according to the invention, the spring support element is designed in such a way that the previously mentioned at least one corrugation peak or the previously mentioned corrugation peaks is/are supported or supportable in the longitudinal spring direction outwardly in the radial direction within the freewheel. This may relate to, for example, the previously mentioned two or more corrugation peaks, at least the corrugation peaks directly following one another on the side of the accordion spring facing the clamping element, or all corrugation peaks of the accordion spring which are supported or supportable outwardly in the radial direction on the spring support element. In this embodiment, even in the case of accordion springs designed to be particularly long in the longitudinal spring direction, it ensures that the buckling and deflection behavior is improved without requiring a direct support of at least one of the corrugation peaks directly on one of the races, even if this may basically apply for additional corrugation peaks. Alternatively or supplemental to this, the spring support element is designed in such a way that the at least one corrugation trough or the corrugation troughs is/are supported or supportable inwardly in the radial direction on the spring support element at maximum extension of the accordion spring in the longitudinal spring direction within the freewheel. The indicated corrugation trough or the indicated corrugation troughs may be, for example, the previously mentioned corrugation trough adjacent to the support leg, two or more corrugation troughs, preferably at least the corrugation troughs directly following one another on the side of the accordion spring facing the clamping element, or all corrugation troughs of the accordion spring which are supported or supportable inwardly in the radial direction on the spring support element.

In another particularly preferred embodiment of the freewheel according to the invention, the biasing means have an intermediate element, via which the support leg of the accordion spring is indirectly supported or supportable on the clamping element. This has the result that any possible wear on the clamping element or on the support leg of the accordion spring is reduced, in particular if the clamping element and the accordions spring are manufactured from metal or steel. In this embodiment, it is preferred if the material of the intermediate element has a lower hardness than the material of the support leg of the accordion spring and/or the clamping element. Thus, the intermediate element may be made, for example, from plastic material whereas the clamping element and the accordion spring—as already previously indicated—may be manufactured from metal or steel. In addition, the intermediate element may function as an entrainment element for the spring support element during extension of the accordion spring if the intermediate element is connected to the spring support element or is even designed to be one piece with the same.

In another advantageous embodiment of the freewheel according to the invention, the accordion spring has a longitudinally extended spring base body, wherein the spring base body—as already indicated at the outset— extends preferably in a radial plane of the freewheel and has a corrugated type progression in the radial direction. It is additionally preferred in this embodiment if the spring base body is designed to be strip like, particularly preferably is formed by a sheet metal strip.

In a particularly advantageous embodiment of the freewheel according to the invention, the spring support element is arranged or guided to be movable in the longitudinal spring direction on the first race or on a component of the freewheel connected rotationally fixed to the first race while supporting the spring support element. The component of the freewheel connected rotationally fixed to the first race is preferably a side part laterally delimiting the clamping gap, thus, for example, an annular disk arranged laterally to the clamping gap. In addition, it is preferred in this embodiment if the spring support element is arranged or guided on a protruding projection on the first race or on the mentioned component of the freewheel, which is connected rotationally fixed to the first race. Furthermore, it is preferred in this embodiment if the spring support element is fixed on the intermediate element or is designed as one piece with the intermediate element, as this has already been previously indicated, in order to achieve not only the entrainment of the spring support element during extension of the accordion spring, but also to achieve a compact structure and a simple manufacturing of the biasing means.

Alternatively to the previously described embodiment, in which a movable or mobile spring support element is provided, the spring support element in another advantageous embodiment of the freewheel according to the invention is stationarily fixed on the first race or on a component of the freewheel connected rotationally fixed to the first race, where appropriate a side part laterally delimiting the clamping gap. As already previously indicated, it is hereby preferred if the spring support element is designed separately from the first race of from the component of the freewheel connected rotationally fixed to the first race, and thus is not designed as one piece with the first race or with the component of the freewheel connected rotationally fixed to the first race.

In another preferred embodiment of the freewheel according to the invention, in which the spring support element is designed as stationary, the intermediate element is movably guided on the spring support element in the longitudinal spring direction of the accordion spring. The movable intermediate element guided on the spring support element is thereby preferably supported in the radial direction on the spring support element.

In another preferred embodiment of the freewheel according to the invention, in which the spring support element may be designed to be movable or stationary, the spring support element has a radially outward support wall for supporting the at least one corrugation peak and a diametrically opposite radially inward support wall for supporting the at least one corrugation trough, wherein the outer and inner support wall are connected to one another via a connection element. In this case, the corrugation peak or the corrugation trough does not have to be continuously supported on the respective support wall; a supportability on the respective support wall which is determined by deformation, where appropriate, is instead sufficient.

In another advantageous embodiment of the freewheel according to the invention, the previously mentioned connection element is, in the case of a movable spring support element, formed by the intermediate element and/or a side wall of the spring support element arranged axially adjacent to the accordion spring in order to achieve a particularly simple structure of the biasing means.

According to another advantageous embodiment of the freewheel according to the invention, the previously mentioned connection element is, in the case of a stationary spring support element, formed by a rear support wall facing away from the clamping element and/or a side wall of the spring support element arranged axially adjacent to the accordion spring. In this embodiment, it is additionally preferred if the accordion spring is indirectly supported or supportable on the first race via the rear support wall or on a component of the freewheel connected rotationally fixed to the first race, where appropriate, a side part laterally delimiting the clamping gap.

According to another particularly advantageous embodiment of the freewheel according to the invention, in which the spring support element has the previously mentioned sidewall, the spring support element additionally has an opening on the side diametrically opposite the side wall in the axial direction, consequently no additional connection part in the form of a side wall. As the one side wall is already sufficient to prevent with relative security an increase of the distance between the outer and inner support walls caused by loading, no additional side wall is provided, instead the opening indicated is provided to achieve a simple and light-weight structure of the biasing means.

In order to be able to arrange the spring support element, and, where appropriate, also the intermediate element guided thereon, to be both particularly flexibly and also arranged in a space saving way in the clamping gap between the first and second race, the spring support element, where appropriate, also the intermediate element guided thereon, is designed as bent or curved. In this case, the bend or curve preferably follows the bend or curve of the races. Alternatively, the radially outer and inner support walls of the spring support element are designed as bent or curved in this embodiment.

In another preferred embodiment of the freewheel according to the invention, the spring support element is not formed from a part separate from the accordion spring, but rather from a section of the accordion spring itself, which shall subsequently be designated as the support section. As the support section of the accordion spring forming the spring support element is consequently formed as one piece with the spring base body of the accordion spring, the manufacturing is significantly simplified.

In another advantageous embodiment of the freewheel according to the invention, the support section of the accordion spring extends to support the at least one corrugation peak or corrugation trough of the accordion spring radially outside of the at least one corrugation peak or radially inside of the at least corrugation peak[sic: trough].

In order to configure the manufacturing of the accordion spring to be particularly simple, the support section of the accordion spring is an extension of the support leg of the accordion spring in another advantageous embodiment of the freewheel according to the invention.

In another preferred embodiment of the freewheel according to the invention, the spring base body of the accordion spring is deformed in the region of the support section of the accordion spring to increase the flexural strength of the support section, in order to achieve a particularly secure support of the at least one corrugation peak or the at least one corrugation trough. For this purpose, it is preferred to provide at least one, where appropriate, longitudinally extended depression in the spring base body in the region of the support section of the accordion spring. The longitudinally extended depression is preferably a so-called crease. In addition, it is particularly preferred in this embodiment if the longitudinally extended depression extends in the extension direction of the support section of the accordion spring, wherein the recess extends in the extension direction of the support section preferably centered in the strip-shaped spring base body.

In another preferred embodiment of the freewheel according to the invention, the biasing means have at least one stop element for supporting the movable spring support element in the direction of the clamping element. It is hereby preferred if the stop element functions between the first race, the previously mentioned component of the freewheel, the side part, or the protruding projection on the one side, and the spring support element on the other. The at least one stop element hereby functions preferably as an assembly aid, wherein it is no longer used in operation of the freewheel, where appropriate, for stopping or support.

According to another advantageous embodiment of the freewheel according to the invention, the biasing means have at least one stop element for supporting the intermediate element in the direction of the clamping element. In this embodiment, it is preferred if the stop element functions between the previously mentioned stationary spring support element on the one side and the intermediate element on the other.

In another preferred embodiment of the freewheel according to the invention, the biasing means have at least one stop element for supporting the previously mentioned support section of the accordion spring in the direction of the clamping element, wherein the stop element functions preferably between the first race or a component of the freewheel connected rotationally fixed to the first race, where appropriate a side part laterally delimiting the clamping gap, particularly preferably a protruding projection on the first race, or the component on the one side, and the support section of the accordion spring on the other.

As previously mentioned, the spring support element and/or the intermediate element is manufactured from plastic material in another advantageous embodiment of the freewheel according to the invention.

In another advantageous embodiment of the freewheel according to the invention, the first race is designed as an outer ring, whereas the second race is designed as an inner ring. Alternatively, the first race in this embodiment is designed as an inner ring, whereas the second race is designed as an outer ring.

The freewheel arrangement according to the invention for a motor vehicle has a freewheel of the type according to the invention. In addition, the freewheel arrangement has a starter gear which is connected rotationally fixed to the second race, a drive output side, thus for example, a drive output side of an internal combustion engine which is connected rotationally fixed to the first race, and a starter motor which is in permanent rotary driving engagement with the starter gear.

In a preferred embodiment of the freewheel arrangement according to the invention, the second race is rotatably supported directly or indirectly in the radial direction on the drive output side or on a stationary housing, where appropriate, via a roller bearing or a slide bearing.

In another preferred embodiment of the freewheel arrangement according to the invention, the freewheel is designed as a dry-running freewheel or as a wet-running freewheel, in an embodiment as a dry-running freewheel, no lubricant is thus provided between the first and second race on the one hand and the clamping elements on the other.

The invention is subsequently explained in greater detail with the aid of exemplary embodiments with reference to the appended drawings.

FIG. 9 shows a perspective presentation of the biasing means from FIG. 8;

FIG. 10 shows a partial front view of the freewheel from FIG. 1 in a seventh embodiment;

FIG. 11 shows a partial front view of the freewheel from FIG. 1 in an eighth embodiment;

FIG. 12 shows a partial front view of the freewheel from FIG. 1 in a ninth embodiment.

Figure 1:
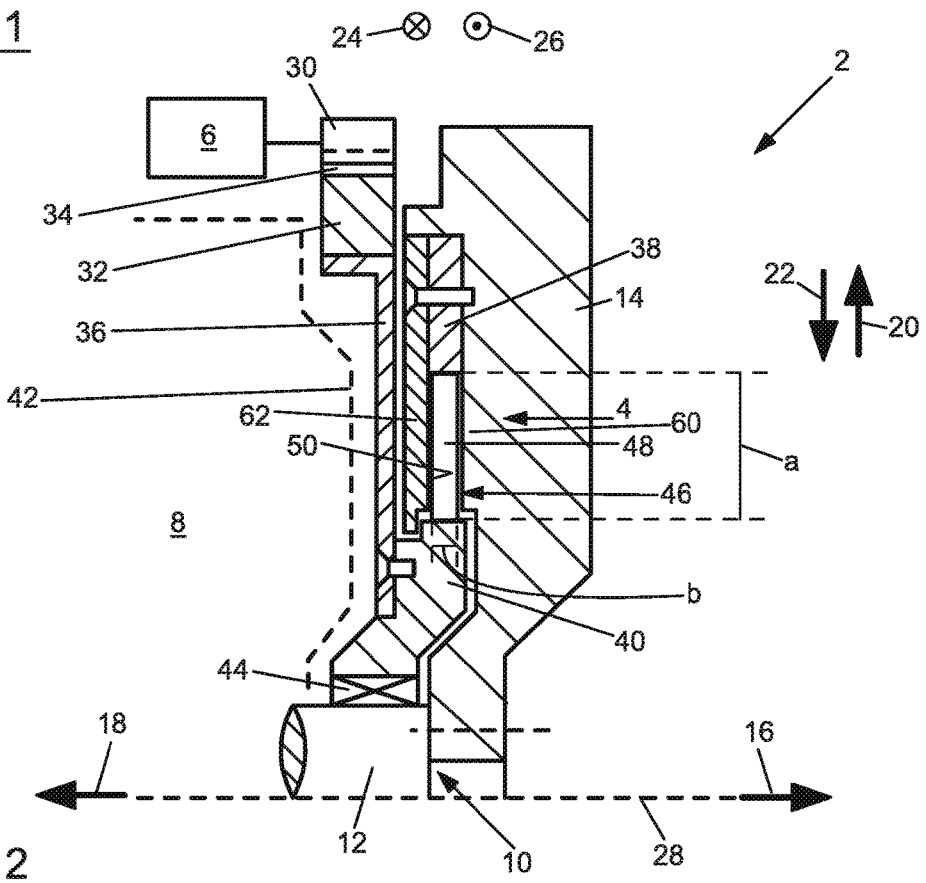
FIG. 1 shows a partial side view of a freewheel arrangement with a freewheel in a cutaway view.

FIG. 1 shows a freewheel arrangement 2 within a motor vehicle. Freewheel arrangement 2 has essentially a freewheel 4, a starter motor 6 which is only indicated schematically in FIG. 1, and a drive unit 8, the drive output side 10 thereof has a drive shaft 12 and a flywheel 14 connected rotationally fixed to drive shaft 12. In the figures, the opposing axial directions 16, 18, the opposing radial directions 20, 22, and the opposing circumferential directions 24, 26 of freewheel arrangement 2 and of freewheel 4 are indicated by means of corresponding arrows. The axis of rotation 28 of drive output side 10 and of freewheel 4 extends in axial directions 16, 18. Circumferential directions 24, 26 may also be designated as directions of rotation.

An output side 30 of starter motor 6, which may be designed, for example, as a type of starter pinion, is arranged in radial direction 20 outside of freewheel 4 such that an output side 30 of starter motor 6 lying radially outward may be discussed with respect to freewheel 4. Output side 30 of starter motor 6 is permanently in rotary driving engagement with a starter gear 32, wherein starter gear 32 has a rotary driving contour 34 for this purpose which is permanently in rotary driving engagement with starter motor 6. Starter gear 32 itself is connected rotationally fixed to a race of freewheel 4 via a starter wheel 36 which extends, starting from starter gear 32, inward in radial direction 22. Stated more exactly, freewheel 4 has a first race 38 and a second race 40, wherein starter gear 36 is connected rotationally fixed to second race 40 of freewheel 4 and extends inward in radial direction 22.

In the embodiment shown, first race 38 of freewheel 4 surrounds second race 40 of freewheel 4 in outward radial direction 20 such that first race 38 in the embodiment shown may also be designated as an outer ring, whereas second race 40 may also be designated as an inner ring of freewheel 4. First race 38 of freewheel 4 designed as the outer ring is connected rotationally fixed to drive output side 10, wherein first race 38 is connected rotationally fixed to the side of flywheel 14 facing in axial direction 18 in the embodiment shown. In contrast, second race 40 is rotatably supported directly or indirectly in radial direction 20, 22 on drive output side 10, in this case, drive shaft 12 of drive output side 10, in circumferential direction 24, 26. Alternatively, however, second race 40 may also be rotatably supported directly or indirectly in radial direction 20, 22 on a stationary housing, for example, housing 42 of drive unit 8 indicated in FIG. 1. In order to effect the rotatably support, this is preferably carried out via a radial bearing, particularly preferably a roller bearing or slide bearing 44, as this is indicated in FIG. 1.

In the embodiment shown, freewheel 4 is designed as a dry-running freewheel. Alternatively, however, freewheel 4 may also be designed as a wet-running freewheel, the supply of the same with coolant and/or lubricant in this case is preferably carried out via the coolant and/or lubricant supply of drive unit 8.

As already previously indicated, first race 38 and second race 40 are arranged nested in radial direction 20, 22 such that a clamping gap 46 is formed between the two running in circumferential direction 24, 26. Within clamping gap 46, multiple clamping elements 48 are arranged spaced uniformly apart from one another in circumferential direction 24, 26, wherein clamping elements 48 are designed as clamping rollers in the embodiment shown, which consequently have a circular circumference or a circular outer contour 50. However, other clamping elements 48 may also be fundamentally used here, thus, for example, clamping bodies or pawls with an outer contour which deviates from a circle.

First race 38 designed as an outer ring has a running surface 52 on the inner side 54 of the first race facing clamping elements 48 in radial direction 22. Circumferential inner side 54 has a form deviating from a circle, as this may be gathered, for example, from FIG. 2. Second race 40 designed as an inner ring has, in contrast a running surface 56 on the outer side 58 of the second race facing clamping elements 48 in radial direction 20. Circumferential outer side 58 of second race 40 designed as an inner ring is thereby designed to be circular. As is clear from FIG. 2, a clamping gap 46 is thus designed between first race 38 and second race 40 and tapers in the region of each clamping element 48 in circumferential direction 26.

Clamping elements 48 designed as clamping rollers have a width b with respect to axial directions 16, 18 and an outer diameter a. The ratio between width b and outer diameter a of the respective clamping elements 48 designed as clamping rollers is equal to or less than 1:3, preferably equal to or less than 1:4, particularly preferably equal to or less than 1:5. In other words, coin shaped clamping elements 48 may also be discussed.

Clamping gap 46 is delimited in axial direction 16 by a first side part 60 and in axial direction 18 by a second side part 62, wherein first side part 60 is formed in the embodiment shown by a section of flywheel 14, whereas second side part 62 is designed separately from flywheel 14 and/or as an annular disk. Both first side part 60 and flywheel 14 designed as first side part 60 and also second side part 62 are fixed rotationally fixed to first race 38 of freewheel 4 designed as an outer ring, which may be carried out, by way of example, by means of the screw connection indicated in FIG. 1. Although this would be fundamentally possible, second side part 62 is not designed as one piece or as integral with first race 38, which simplifies the manufacturing of freewheel 4.

Figure 2:
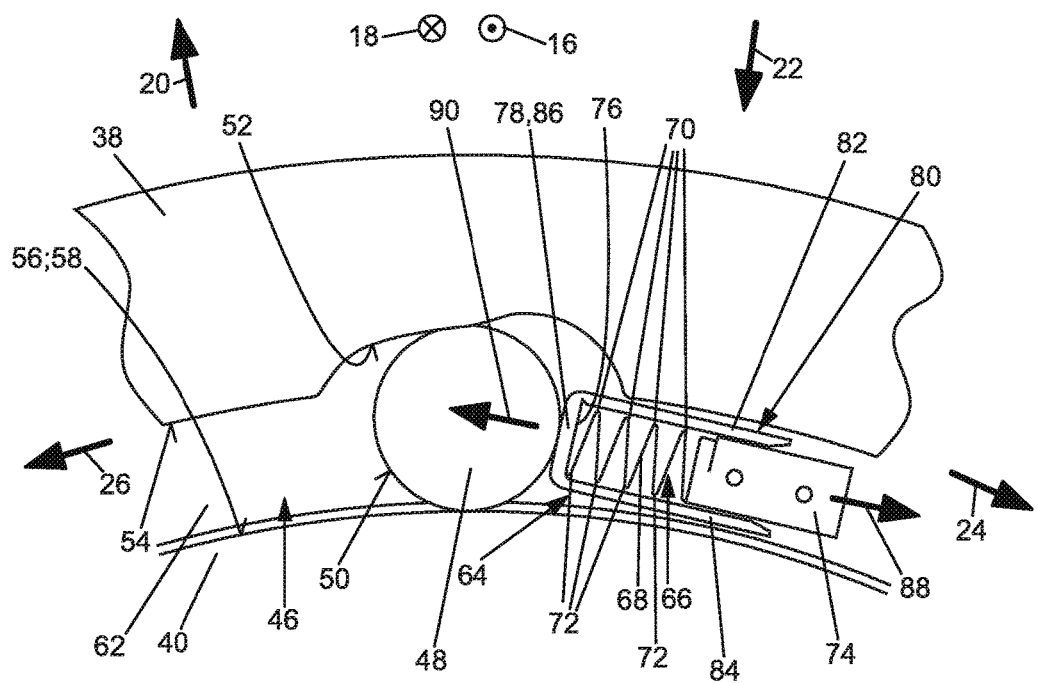
FIG. 2 shows a partial front view of the freewheel from FIG. 1 in a first embodiment.

Clamping elements 48 may each be moved from a clamping position, which is indicated, for example, in FIG. 2 and in which clamping element 48 prevents a rotation of first race 38 relative to second race 40 in first circumferential direction 24, into a release position in which first race 38 is rotatable in the opposing second circumferential direction 26 relative to second race 40. Consequently, freewheel 4 is a so-called one-way clutch in its basic structure. The respective clamping element 48 is thereby biased in circumferential direction 26 into tapering clamping gap 42 with the aid of biasing means 64 into the clamping position shown by way of example in FIG. 2.

A first embodiment of freewheel 4 or biasing means 64 will be subsequently described with reference to FIG. 2.

Biasing means 64 have an accordion spring 66 supported directly or indirectly on first race 38 in circumferential direction 24. Accordion spring 66 thereby has a longitudinally extended spring base body 68, which is designed to be strip like, preferably formed from a sheet metal strip. Spring base body 68 of accordion spring 66 runs in a radial plane and is thereby designed to be corrugated in radial direction 20, 22 in order to form the corresponding accordion spring 66. Consequently, accordion spring 66 has corrugation peaks 70 lying radially outward and corrugation troughs 72 lying radially inward. The previously mentioned direct or indirect support on first race 38 in circumferential direction 24 of accordion spring 66 is, in the embodiment shown, interpreted as indirect support. Thus, a projection 74, which protrudes into clamping gap 46 in axial direction 16, is fixed on previously mentioned second side part 62, so that accordion spring 66 is indirectly supported on first race 38 via projection 74 and second side part 62. In the embodiment shown, projection 74 is designed separately from second side part 62, consequently, projection 74 has been subsequently fixed on second side part 62 without being integrally connected to side part 62.

In addition, accordion spring 66 has a support leg 76 on the side facing away from projection 74 in circumferential direction 26, the support leg functions as the direct or indirect support on the respective clamping element 48. In the embodiment shown, the support of support leg 76 on clamping element 48 is carried out indirectly via an intermediate element 78 of biasing means 64. Intermediate element 78 or the material thereof thereby has a lower hardness than accordion spring 66 or the material thereof, and than clamping element 48 or the material thereof, wherein intermediate element 78 is preferably manufactured from a plastic material.

In addition, biasing means 64 have a spring support element 80 on which at least one of corrugation peaks 70 is supported or supportable outward in radial direction 20 and/or at least one of corrugation troughs 72 is supported or supportable inward in radial direction 22. Thus, spring support element 80 in the embodiment according to FIG. 2 has a radially outer support wall 82 for supporting the at least one corrugation peak 70 outward in radial direction 20 and a diametrically opposite radially inner support wall 84 for supporting the at least one corrugation trough 72 inward in radial direction 22, wherein the two support walls 82, 84, between which accordion spring 66 is arranged, are connected to one another via a connection element 86. In the embodiment shown, connection element 86 is formed by previously mentioned intermediate element 78. Alternatively or supplementally however, a connection element 86 might be provided in the form of a side wall of spring support element 80 arranged axially adjacent to accordion spring 66; in the embodiment according to FIG. 2, for example, a side wall in axial direction 16 adjacent to accordion spring 66. Consequently, spring support element 80 in the embodiment according to FIG. 2 is fixed on intermediate element 78, where appropriate, also the indicated side wall, or is designed as one piece with intermediate element 78, where appropriate, also with the indicated side wall.

In the embodiment according to FIG. 2, spring support element 80 is moveably arranged in longitudinal spring directions 88, 90 of accordion spring 66 on projection 74 and is guided on second side part 62 laterally delimiting clamping gap 46 and supporting the second lateral side part in radial direction 20, 22. Consequently, it may also be stated that there is a movable arrangement of spring support element 80 indirectly on second side part 62, which represents a component of freewheel 4 connected rotationally fixed to first race 38, or on first race 38. Spring support element 80 is also, like intermediate element 78, preferably manufactured from a plastic material, wherein the material of spring support element 80 preferably has a lower hardness than the material of accordion spring 66 and/or the material of first race 38. It should also be mentioned that spring support element 80 is designed separately from second side part 62 and first race 38, consequently, it is not designed as one piece with these components.

To effect the previously mentioned guiding of the spring support element 80 on projection 74, the end of outer support wall 82 facing in circumferential direction 24 surrounds projection 74 outward in radial direction 20, whereas inner support wall 84 of spring support element 80 surrounds projection 74 inward in radial direction 22. It is further clear from FIG. 2 that the end facing support leg 76, thus the end of accordion spring 66 facing in spring longitudinal direction 88, is fixed on projection 74. Correspondingly, support leg 76 might also be fixed on spring support element 80 and/or on intermediate element 78; this is, however, not mandatory.

In the embodiment according to FIG. 2, all corrugation peaks 70—where appropriate, only at corresponding loading of accordion spring 66—are supported or supportable outward in radial direction 20 on outer support wall 82 of spring support element 80. In addition, in the first embodiment, all corrugation troughs 72—where appropriate, only at corresponding loading of accordion spring 66—are supported or supportable inward in radial direction 22 on inner support wall 84 of spring support element 80. By this means, a particularly good buckling or deflection behavior of accordion spring 66 is achieved. However, it does not have to be mandatory that all corrugation peaks 70 and/or corrugation troughs 72 are supported or supportable. Thus, it may, for example, already be advantageous if the at least one corrugation peak 70, which is supported or supportable outward in radial direction 20 on spring support element 80, is formed as that corrugation peak 70 which is arranged adjacent to support leg 76. It may also already be advantageous if not all corrugation peaks 70 are supported or supportable outward in radial direction 20 on spring support element 80, but instead merely two or more corrugation peaks 70. In this context, it has proven advantageous if at least the corrugation peaks 70 directly following one another on the side of accordion spring 66 facing clamping element 48 are supported or supportable outward in radial direction 20 on spring support element 80. This correspondingly applies for corrugation troughs 72. Thus, the at least one corrugation trough 72, which is supported or supportable inward in radial direction 22 on spring support element 80, may be formed as that corrugation trough 72 which is arranged adjacent to support leg 76. It may also be advantageous if not all corrugation troughs 72 are supported or supportable inward in radial direction 22 on spring support element 80, but instead merely two or more corrugation troughs 72—where appropriate, only at a corresponding loading. In this case as well, it has proven advantageous if at least the corrugation troughs 72 directly following one another on the side of accordion spring 66 facing clamping element 48 are supported or supportable inward in radial direction 22 on spring support element 80.

In addition, it is advantageous, regardless of the respective embodiment shown, if support leg 76 of accordion spring 66 is also supported directly or indirectly in radial direction 20 and/or 22 via spring support element 80, in order to improve the buckling or deflection behavior of support leg 76, wherein a corresponding support is also shown in the first embodiment according to FIG. 2.

The at least one corrugation peak 70 or corrugation peaks 70 is/are also supported or supported outward in radial direction 20, 22 on spring support element 80 at maximum extension of accordion spring 66 in longitudinal spring direction 88, 90 within freewheel 4, in order to ensure a good buckling or deflection behavior of accordion spring 66 even at large spring paths or extensions of accordion spring 66 within clamping gap 46. This correspondingly applies for the corrugation troughs 72, such that the at least one corrugation trough 72 or corrugation troughs 72 is/are also supported or supported inward in radial direction 22 on spring support element 80 at maximum extension of accordion spring 66 in longitudinal spring direction 88, 90 within freewheel 4.

If the previously mentioned side wall is omitted in the embodiment according to FIG. 2, then, a substantially U-shaped component may be discussed with regard to spring support element 80 comprising the outer and inner support wall 82, 84 in combination with intermediate element 78, which has a simple and compact structure such that the spatial requirement is low and the manufacturing thereof is simplified. If, in contrast, the previously mentioned side wall is additionally provided, then the additional advantage is achieved that the distance between outer and inner support wall 82, 84 is not expanded at corresponding loading, so that a particularly secure support of corrugation peaks 70 and corrugation troughs 72 is ensured.

Figure 3:
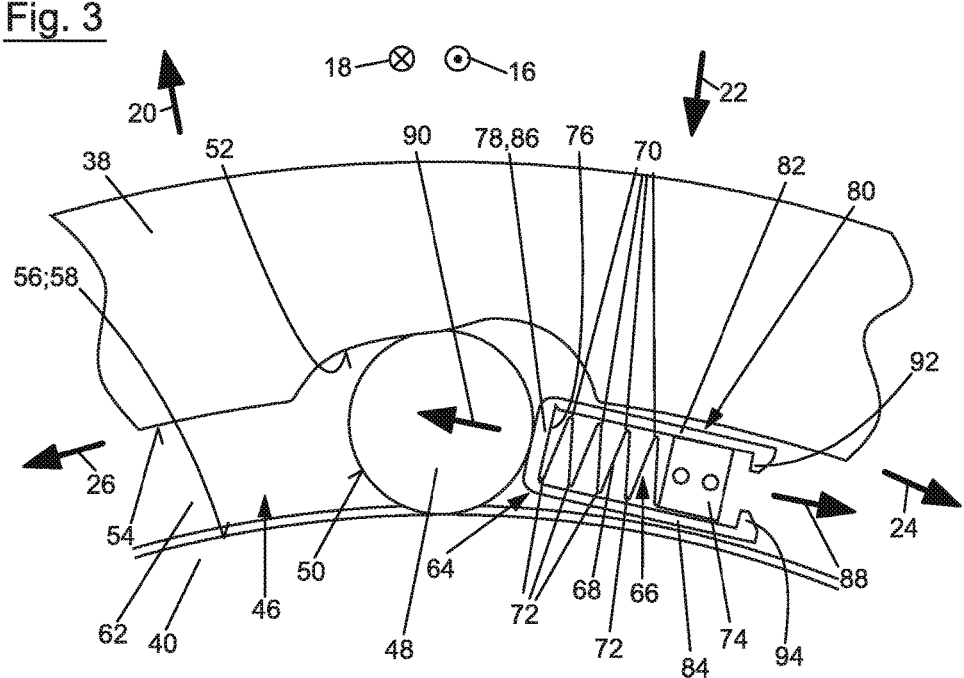
FIG. 3 shows a partial front view of the freewheel from FIG. 1 in a second embodiment.

FIG. 3 shows a second embodiment of freewheel 4 or biasing means 64, which substantially corresponds to the first embodiment according to FIG. 2, such that subsequently only the differences shall be dealt with; the same references numerals are used for the same or similar parts, and the previous description correspondingly applies in general.

In the second embodiment according to FIG. 3, biasing means 64 additionally have a stop element 92, 94 to support the spring support element 80, which is movable in spring longitudinal direction 88, 90 in the direction of clamping element 48, consequently in spring longitudinal direction 90. Thus, stop element 92 is arranged on outer support wall 82, whereas stop element 94 is arranged on inner support wall 84. Both stop elements 92, 94 are arranged in circumferential direction 24 or in spring longitudinal direction 88 behind projection 74, wherein stop element 92 extends inward starting from outer support wall 82 in radial direction 22 and stop element 94 extends outward starting from inner support wall 84 in radial direction 20, such that spring support element 80 is supported or supportable, during corresponding elongation of accordion spring 66 in spring longitudinal direction 88, 90, an projection 74 in spring longitudinal direction 90 or circumferential direction 26 via stop elements 92, 94. Consequently, the two stop elements 92, 94 function between projection 74 and spring support element 80. In the second embodiment, a fixing of the end of accordion spring 66 facing in spring longitudinal direction 88 on projection 74 may be omitted. Stop elements 92, 94 are preferably designed as one piece with spring support element 80. In addition, stop elements 92, 94 function to secure spring support element 80 and accordion spring 66 during the assembly of freewheel 4. Stop elements 92, 94 are preferably arranged in such a way that they do not or no longer stop on projection 74 in the assembled freewheel 4 and thus during operation of freewheel 4.

Figure 4:
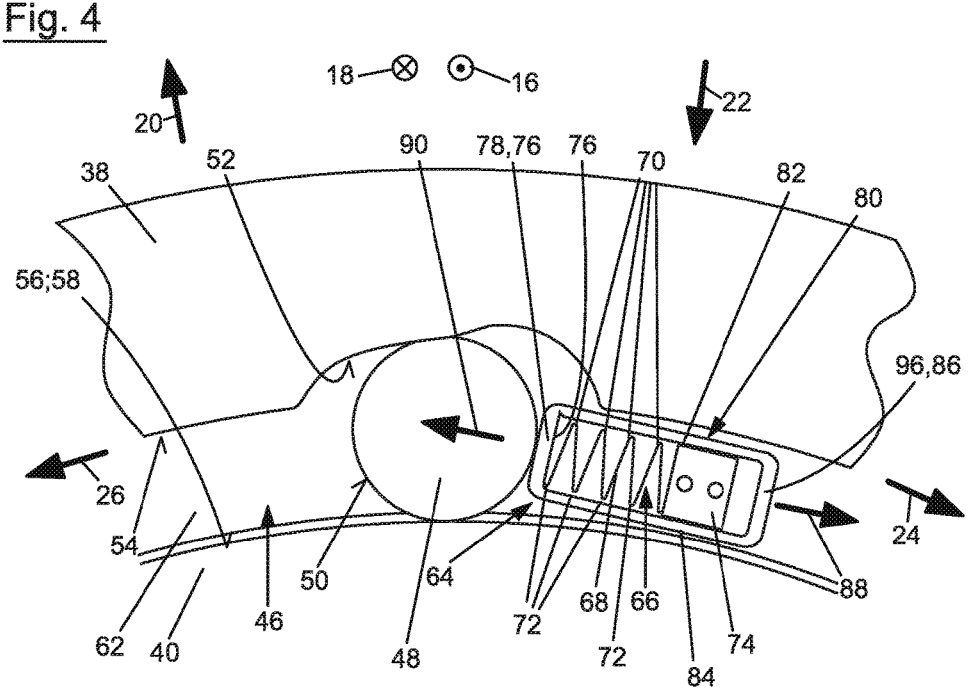
FIG. 4 shows a partial front view of the freewheel from FIG. 1 in a third embodiment.

FIG. 4 shows a third embodiment of freewheel 4, which substantially corresponds to the embodiment according to FIG. 3, such that subsequently only the differences shall be dealt with; the same references numerals are used for the same or similar parts, and the previous description correspondingly applies in general.

In the third embodiment, only one stop element 96 is used instead of two stop elements 92, 94. Stop element 96 is arranged in turn behind projection 74 in circumferential direction 24 or spring longitudinal direction 88; however, stop element 96 connects the rear sections, facing in circumferential direction 24, of outer and inner support walls 82, 84 in radial directions 20, 22 with one another. Consequently, stop element 96 of the third embodiment forms, just like intermediate element 78, a connection element 86 of the previously described type, which connects outer and inner support walls 82, 84 with one another. Stop element 96 is also preferably designed for this purpose as one piece with outer and inner support walls 82, 84. In the third embodiment, outer and inner support walls 82, 84 thus form, in combination with intermediate element 78 and stop element 96, a substantially ring-shaped or O-shaped component, which may be arranged in a particularly space-saving way within clamping gap 46 and enables a simple manufacturing of the same. As stop element 96 already effectively prevents a pushing apart of outer and inner support walls 82, 84 during compression of accordion spring 66, a side wall connecting outer and inner support walls 82, 84, which would be arranged axially adjacent to accordion spring 66, may also be omitted, even if such a side wall might basically be provided here for additional support.

Figure 5:
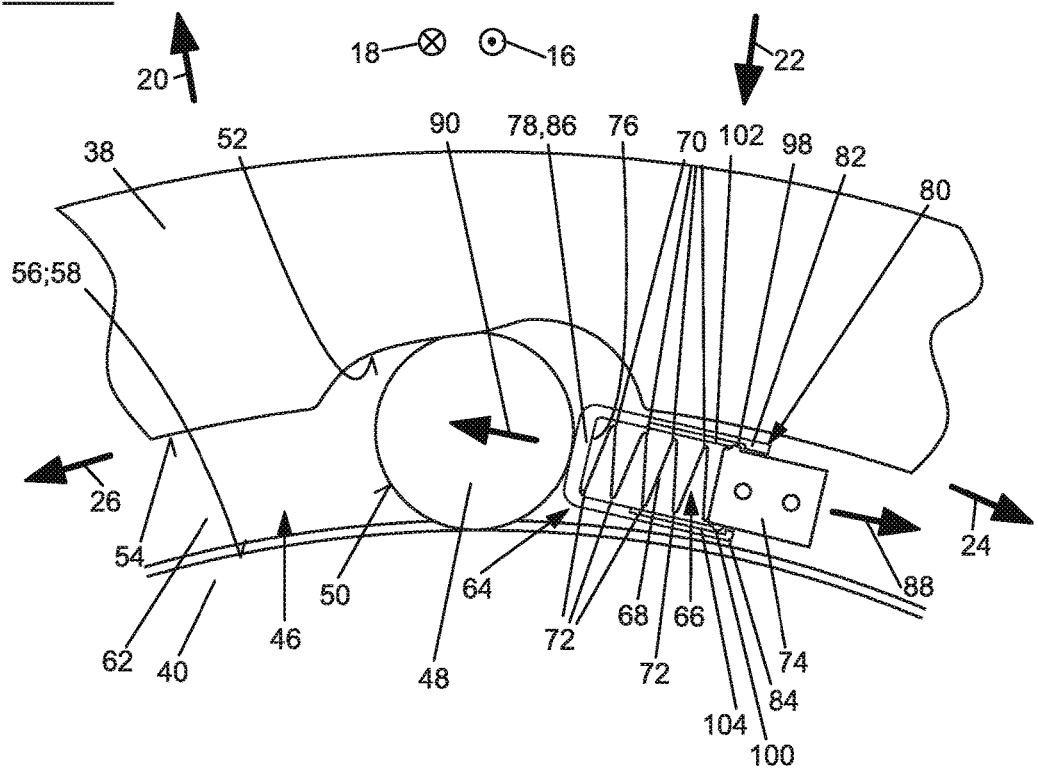
FIG. 5 shows a partial front view of the freewheel from FIG. 1 in a fourth embodiment.

FIG. 5 shows a fourth embodiment of freewheel 4, wherein the fourth embodiment substantially corresponds to the embodiments according to FIGS. 2 through 4, such that subsequently only the differences shall be dealt with; the same references numerals are used for the same or similar parts, and the previous description correspondingly applies in general.

As already provided in the second embodiment according to FIG. 3, two stop elements 98, 100 are also provided in the embodiment according to FIG. 5. The two stop elements 98, 100 function in the embodiment according to FIG. 5 similarly to guide parts which each extend into a guide 102, 104 extending in spring longitudinal direction 88, 90 in order to guide spring support element 80 securely and in a targeted way on projection 74. In the embodiment variant shown in FIG. 5, stop elements 98, 100 are provided on projection 74, whereas guides 102 and 104 are provided on spring support element 80. Stated more exactly, guide 102 is provided on the side of outer support wall 82 facing inward in radial direction 22, whereas guide 104 is provided on the side of inner support wall 84 facing outward in radial direction 20. The stop element or guide part 98 is arranged in a corresponding way on the side of projection 74 facing outward in radial direction 20, whereas stop element or guide part 100 is provided on the side of projection 74 facing inward in radial direction 22.

Figure 6:
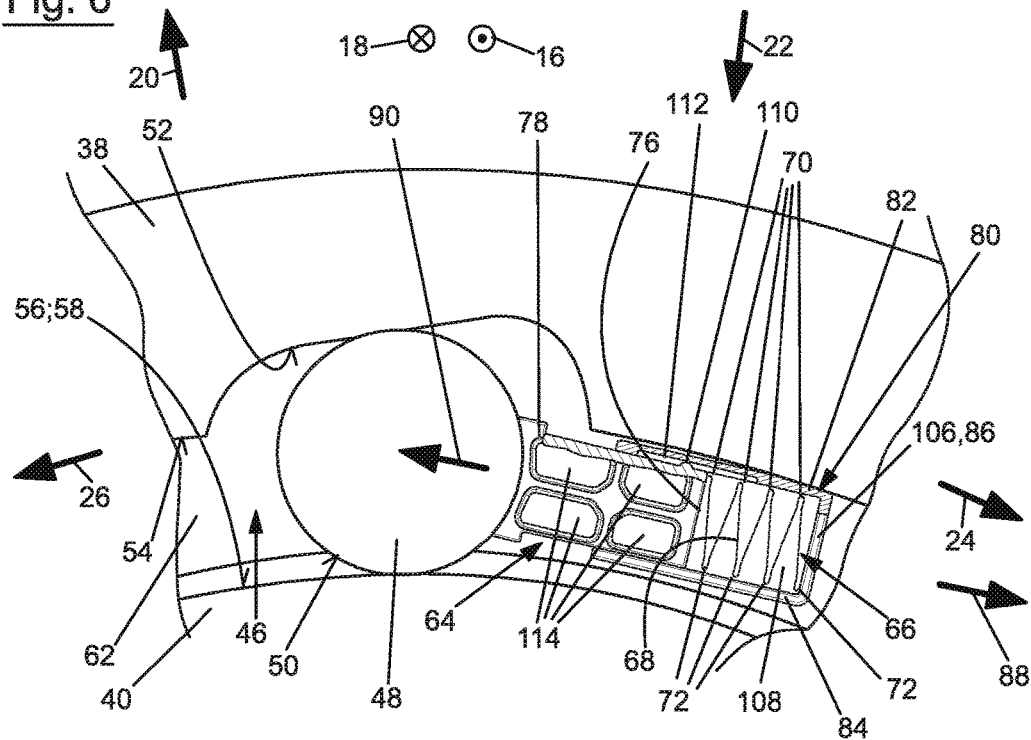
FIG. 6 shows a partial front view of the freewheel from FIG. 1 in a fifth embodiment.
Figure 7:
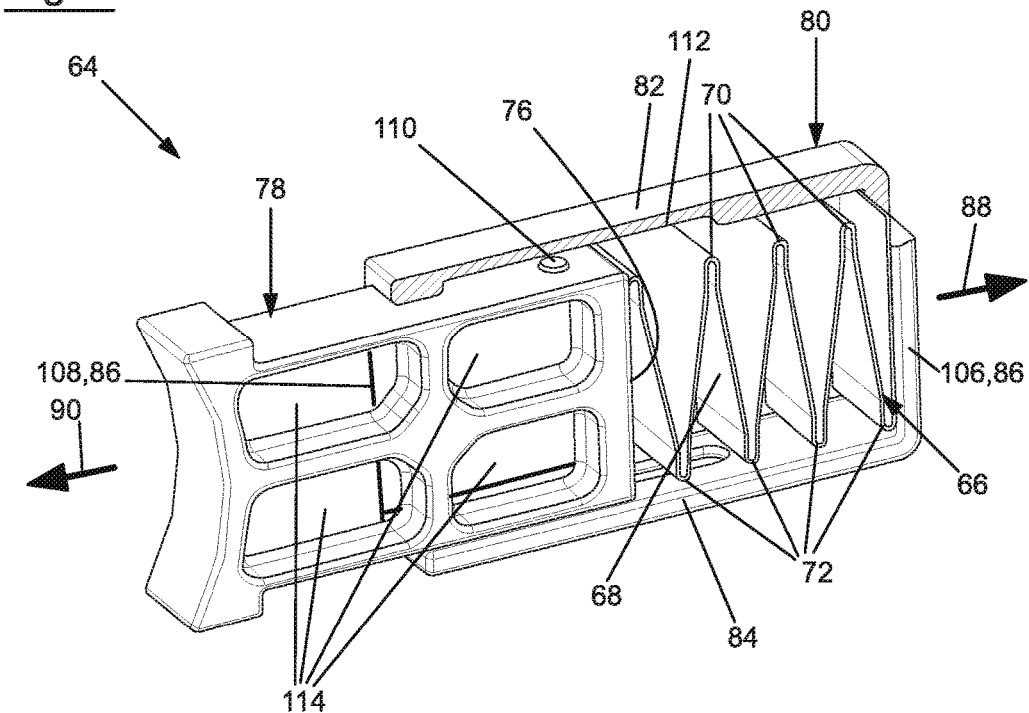
FIG. 7 shows a perspective and partial cutaway presentation of the biasing means from FIG. 6.

FIGS. 6 and 7 show a fifth embodiment of freewheel 4 or biasing means 64, which substantially corresponds to the previously described embodiments, such that subsequently only the differences shall be dealt with; the same references numerals are used for the same or similar parts, and the previous description correspondingly applies in general.

In the embodiment according to FIG. 6, spring support element 80 is not movable, but instead is fixed stationarily on first race 38 or on a component of freewheel 4 connected rotationally fixed to first race 38. Stated more exactly, spring support element 80 in the embodiment shown is fixed on second side wall 62 laterally delimiting clamping gap 46.

Thus, spring support element 80 in the embodiment shown indeed also has the previously described outer support wall 82 and inner support wall 84; however, intermediate element 78 is not designed as stationary on spring support element 80 or even as one piece with the same. Instead, intermediate element 78 is movably guided on spring support element 80 in spring longitudinal direction 88, 90 of accordion spring 66, wherein this is carried out with support of intermediate element 78 in radial directions 20, 22 on stationary spring support element 80. In the specific embodiment according to FIGS. 6 and 7, intermediate element 78 is guided for this purpose in spring longitudinal direction 88, 90 between outer and inner support wall 82, 84 in radial direction 20, 22. Stationary spring support element 80 also has a rear support wall 106, which faces away from clamping element 48 and carries out not only the function of the previously described connection element 86, but instead the end of accordion spring 66 facing in spring longitudinal direction 88 is supported or supportable in spring longitudinal direction 88 on rear support wall 106 of spring support element 80, and thus indirectly on first race 38, specifically via spring support element 80 and second side part 62. Basically, spring support element 80 might be designed in this embodiment and in its simplest form likewise merely as a U-shape made from outer support wall 82, inner support wall 84, and rear support wall 106, which connects the two support walls 82, 84 with one another, in order to achieve a compact and space-saving structure. However, in order to further enable a simple fixing on second side part 62 and to prevent outer and inner support wall 82, 84 from moving apart from one another in radial direction 20, 22 when under load, a side wall 108 of spring support element 80 is arranged adjacent to accordion spring 66 in axial direction 18 in the embodiment shown, which side wall 108 connects outer and inner support wall 82, 84 to one another. Basically, an additional side wall of spring support element 80 might be designed, which connects outer and inner support wall 82, 84, on the side opposite side wall 108 in axial direction 16; however, this would provide little or no advantage, such that it is preferred, as shown in FIGS. 6 and 7, if an opening is provided on the side opposite side wall 108 in axial direction 16 in order to be able to easily insert accordion spring 66 and intermediate element 78 and to achieve a particularly compact and space-saving structure of biasing means 64.

It is additionally clear from FIGS. 6 and 7 that at least one stop element 110 is in turn provided on biasing means 64 which functions in turn as a guide part, wherein stop element 110 functions to support intermediate element 78 in the direction of clamping element 48 and thus in spring longitudinal direction 90. Thus, stop element 110 functions between stationary spring support element 80 and intermediate element 78. In the embodiment shown, stop element 110 is provided on intermediate element 78, wherein stop element 110 or guide part 110 extends into a guide 112 on spring support element 80. Guide 112 thereby extends in spring longitudinal direction 88, 90 along spring support element 80. In the embodiment shown, this guide 112 is provided on the side of outer support wall 82 of stationary spring support element 80 facing inward in radial direction 22. As indicated in FIG. 7, a corresponding stop element/guide part and an associated guide may be provided alternatively or supplementally on the radially opposite side.

It is further clear from FIGS. 6 and 7 that intermediate element 78 has at least one axial opening 114 in order to achieve a light-weight structure of biasing means 64 despite the longitudinally extended design of intermediate element 78 in spring longitudinal direction 88, 90, and to achieve an particularly good lubrication, in the case of a wet-running freewheel 4.

Figure 8:
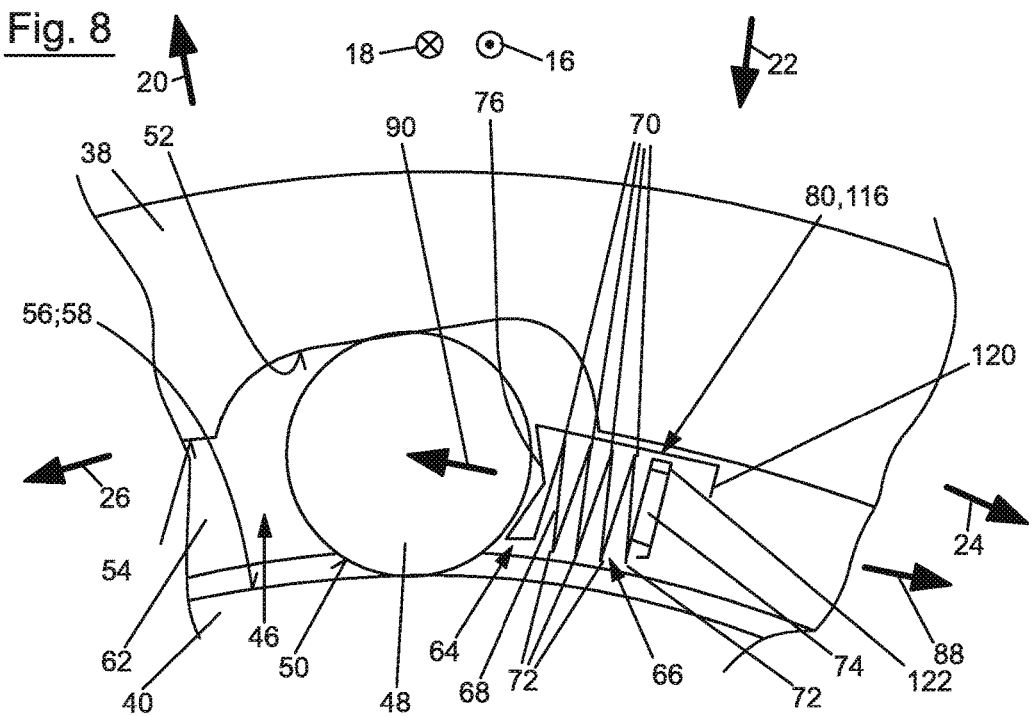
FIG. 8 shows a partial front view of the freewheel from FIG. 1 in a sixth embodiment.

FIGS. 8 and 9 show a sixth embodiment of freewheel 4 or biasing means 64, which substantially corresponds to the previously described embodiments, such that subsequently only the differences shall be dealt with; the same references numerals are used for the same or similar parts, and the previous description correspondingly applies in general.

In the sixth embodiment according to FIGS. 8 and 9, spring support element 80 is not designed separately from accordion spring 66, instead, spring support element 80 is formed from a section of accordion spring 66 which is subsequently designated as support section 116. In the embodiment shown, support section 116 is formed in particular by an extension of support leg 76 of accordion spring 66, wherein support section 116 of accordion spring 66 extends outside of at least one corrugation peak 70, in this case all corrugation peaks 70, to support at least one corrugation peak 70, in this case all corrugation peaks 70, in radial direction 20. Even if not shown in FIGS. 8 and 9, a support section of accordion spring 66 might thus extend alternatively or supplementally inside of at least one corrugation trough 72 to support at least one corrugation trough 72 in radial direction 22.

In the region of support section 116 of accordion spring 66, spring base body 68 is deformed while increasing the flexural stiffness of support section 116. As is clear from FIG. 9, a longitudinally extended depression 118 is provided in spring base body 68 for this purpose in the region of support section 116 of accordion spring 66, and depression 118 extends in the extension direction of support section 116 of accordion spring 66, in this case centered in the strip-shaped spring base body 68. Generally stated, spring base body 68 is to be deformed in support section 116 while deviating from a straight line course in axial direction 16, 18 in order to increase the flexural stiffness.

In addition, biasing means 64 according to FIGS. 8 and 9, which are reduced essentially to accordion spring 66, have at least one stop element 120 to support section 116 of accordion spring 66 in the direction of clamping element 48 and thus in spring longitudinal direction 90. Stop element 120 also functions preferably between first race 38 or a component of freewheel 4 connected rotationally fixed to first race 38, where appropriate, second side part 62 laterally delimiting clamping gap 46 or first side part 60. In the embodiment shown, stop element 120 interacts with projection 74 and support section 116 of accordion spring 66. Stated more exactly, in this case, as previously indicated, stop element 120 is arranged behind projection 74 in circumferential direction 24 or in spring longitudinal direction 88, in order to stop at projection 74 during a corresponding extension of accordion spring 66 in spring longitudinal direction 88, 90 in circumferential direction 26 or spring longitudinal direction 90, in this case, with a fixing section 122[sic: elsewhere stop element/guide part] of accordion spring 66 arranged in between, which fixing section functions to fix accordion spring 66 on projection 74. Projection 74 may thereby be designed as a type of projection 74 previously described; however, it is just as possible to design projection 74 as one piece with second side part 62, for example, as a tongue bent outward from second side part 62.

During operation of freewheel 2[sic: 4] according to FIGS. 8 and 9, corrugation peaks 70 are continuously supported or supportable outward in radial direction 20 on support section 166 of accordion spring 66 only during corresponding compression of accordion spring 66, wherein support section 116 for its part is supported or supportable outward in radial direction 20 on inner side 54 of first race 38.

FIG. 10 shows a seventh embodiment of freewheel 4 or biasing means 64, which substantially corresponds to the embodiment according to FIG. 3, such that subsequently only the differences shall be dealt with; the same references numerals are used for the same or similar parts, and the previous description correspondingly applies in general.

As is clear from FIG. 10, spring support element 80 is designed as bent or curved in circumferential direction 24, 26. Stated more exactly, radially outer support wall 82 and radially inner support wall 84 are designed as curved in circumferential direction 24, 26 in order to achieve a particularly space-saving arrangement of biasing means 64 within clamping gap 46. Even if not shown in FIG. 10, these features may correspondingly apply for a stationary spring support element 80, as is shown, for example, in FIGS. 6 and 7. in this case, intermediate element 78 guided on spring support element 80 is also designed as bent or curved in circumferential direction 24, 26. In the specific embodiment according to FIG. 10, projection 74, on which spring support element 80 is guided, is also designed as bent or curved in circumferential direction 24, 26 in order to be able to safely guide curved or bent spring support element 80 in a targeted way on a curved or bent track within clamping gap 46. It should be noted that the bending or curving does not necessarily have to correspond to the bending or curving of a circumferential circle within clamping gap 46, instead it may already be a minor bending or curving in order to reduce the installation space required for biasing means 64 within clamping gap 46.

FIG. 11 shows an eighth embodiment of freewheel 4 or biasing means 64, which substantially corresponds to the embodiment according to FIG. 5, such that subsequently only the differences shall be dealt with; the same references numerals are used for the same or similar parts, and the previous description correspondingly applies in general.

In contrast to the embodiment according to FIG. 5, stop elements/guide parts 98, 100 in the eighth embodiment are provided on spring support element 80, whereas the associated guides 102, 104 are provided on projection 74. Stated more exactly, stop element/guide part 98 is arranged on the side of outer support wall 82 facing inward in radial direction 22, and stop element/guide part 100 is arranged on the side of inner support wall 84 facing outward in radial direction 20, whereas guide 102 assigned to stop element/guide part 98 is arranged on the side facing outward in radial direction 20, and guide 104 assigned to stop element/guide part 100 is arranged on the side of projection 74 facing inward in radial direction 22. This enables a particularly stable design of spring support element 80. In addition, spring support element 80 is designed as bent or curved in circumferential direction 24, 26. Stated more exactly, radially outer support wall 82 and radially inner support wall 84 are designed as curved in circumferential direction 24, 26 in order to achieve a particularly space-saving arrangement of biasing means 64 within clamping gap 46. In addition, projection 74, on which spring support element 80 is guided, is also designed as bent or curved in circumferential direction 24, 26 in order to be able to safely guide curved or bent spring support element 80 in a targeted way on a curved or bent track within clamping gap 46. As already explained with reference to FIG. 10, the bending or curving does not necessarily have to correspond to the bending or curving of a circumferential circle within clamping gap 46, instead it may already be a minor bending or curving in order to reduce the installation space required for biasing means 64 within clamping gap 46. It may, however, be advantageous in this case, and also preceding and subsequently, if the bending or curving corresponds to the bending or curving of a circumferential circle within clamping gap 46.

FIG. 12 shows a ninth embodiment of freewheel 4 or biasing means 64, which substantially corresponds to the embodiment according to FIGS. 6 and 7, such that subsequently only the differences shall be dealt with; the same references numerals are used for the same or similar parts, and the previous description correspondingly applies in general.

In contrast to the embodiment according to FIGS. 6 and 7, stop element/guide part 110 in the ninth embodiment is provided on spring support element 80, whereas associated guide 112 is provided on intermediate element 78. Stated more exactly, stop element/guide part 110 is arranged on the side of outer support wall 82 facing inward in radial direction 22, whereas guide 112 assigned to stop element/guide part 110 is arranged on the side of intermediate element 78 facing outward in radial direction 20. In addition, a stop element/guide part 122 is provided on the side of inner support wall 84 facing outward in radial direction 20, which stop element/guide part 122 was merely indicated in the embodiment according to FIGS. 6 and 7 and a guide 124, likewise previously indicated and assigned thereto, is arranged on the side of intermediate element 78 facing inward in radial direction 22. In addition, spring support element 80 is designed as bent or curved in circumferential direction 24, 26. Stated more exactly, radially outer support wall 82 and radially inner support wall 84 are designed as curved in circumferential direction 24, 26 in order to achieve a particularly space-saving arrangement of biasing means 64 within clamping gap 46. In this case, intermediate element 78 guided on spring support element 80 is also designed as bent or curved in circumferential direction 24, 26. As already explained with reference to FIGS. 10 and 11, the bending or curving does not necessarily have to correspond to the bending or curving of a circumferential circle within clamping gap 46, instead it may already be a minor bending or curving in order to reduce the installation space required for biasing means 64 within clamping gap 46. It may, however, also be advantageous in this case, if the bending or curving corresponds to the bending or curving of a circumferential circle within clamping gap 46.

Even if first race 38 is always designed as an outer ring in the preceding, whereas second race 40 is always designed as an inner ring, the preceding embodiments apply correspondingly or analogously for freewheels 4 in which first race 38 is designed as an inner ring whereas second race 40 is designed as an outer ring.

LIST OF REFERENCE NUMERALS

2 Freewheel arrangement
4 Freewheel
6 Starter
8 Drive unit
10 Drive output side
12 Driveshaft
14 Flywheel
16 Axial direction
18 Axial direction
20 Radial direction
22 Radial direction
24 Circumferential direction
26 Circumferential direction
28 Axis of rotation
30 Output side
32 Starter gear
34 Rotary driving contour
36 Starter wheel
38 First race
40 Second race
42 Housing
44 Radial bearing
46 Clamping gap
48 Clamping element
50 Outer contour
52 Running surface
54 Inner side
56 Running surface
58 Outer side
60 First side part
62 Second side part
64 Biasing means
66 Accordion spring
68 Spring base body
70 Corrugation peaks
72 Corrugation troughs
74 Projection
76 Support leg
78 Intermediate element
80 Spring support element
82 Outer support wall
84 Inner support wall
86 Connection element
88 Spring longitudinal direction
90 Spring longitudinal direction
92 Stop element
94 Stop element
96 Stop element
98 Stop element/Guide part
100 Stop element/Guide part
102 Guide
104 Guide
106 Rear support wall
108 Side wall
110 Stop element/Guide part
112 Guide
114 Axial opening
116 Support section
118 Depression
120 Fixing section [sic:Stop element]
122 Stop element/Guide part [sic: also Fixing section]
124 Guide
a Outer diameter
b Width

The invention claimed is:

1. A freewheel (4) comprising a first race (38), a second race (40), a clamping gap (46) designed between the first and second race (38, 40), at least one clamping element (48) in the clamping gap (46), and biasing means (64) for biasing the clamping element (48) into a clamping position within the clamping gap (46), wherein the biasing means (64) have an accordion spring (66), which is supported directly or indirectly on the first race (38) and which comprises corrugation peaks (70) lying radially outward, corrugation troughs (72) lying radially inward, and a support leg (76) for direct or indirect support on the clamping element (48), characterized in that the biasing means (64) have a spring support element (80) on which at least one of the corrugation peaks (70) is supported or supportable outwardly in radial direction (20) and/or at least one of the corrugation troughs

(72) is supported or supportable inwardly in radial direction (22), wherein the spring support element (80) is stationarily fixed on the first race (38) or on a component of the freewheel (4) connected rotationally fixed to the first race (38), where the freewheel (4) includes a side part (62) laterally delimiting the clamping gap (46), wherein an intermediate element (78) is movably guided on the spring support element (80) in a longitudinal spring direction (88, 90) along opposing circumferential directions (24, 26) of the accordion spring (66) and wherein the biasing means (64) have at least one stop element (110) for supporting the intermediate element (78) in the direction of the clamping element (48), wherein the stop element (110) functions between the spring support element (80) and the intermediate element (78).

2. The freewheel (4) according to claim 1, characterized in that the at least one corrugation peak (70) is supported or supportable outwardly in the radial direction (20) on the spring support element (80) and is that corrugation peak adjacent to the support leg (76), and/or two or more corrugation peaks (70) are supported or supportable outwardly in the radial direction (20) on the spring support element (80), and/or the at least one corrugation trough (72) is supported or supportable inwardly in the radial direction (22) on the spring support element (80) and is the corrugation trough (72) adjacent to the support leg (76), and/or two or more corrugation troughs (72) are supported or supportable inwardly in the radial direction (22) on the spring support element (80).

3. The freewheel (4) according to claim 1, characterized in that the at least one corrugation peak (70) or the corrugation peaks (70) is/are supported or supportable outward in radial direction (20) at the accordion spring (66) in the longitudinal spring direction (88, 90) along the opposing circumferential directions (24, 26) within the freewheel (4), and/or the at least one corrugation trough (72) or the corrugation troughs (72) is/are supported or supportable inward in radial direction (22) at maximum extension of the accordion spring (66) in the longitudinal spring direction (88, 90) along the opposing circumferential directions (24, 26) within the freewheel (4).

4. The freewheel (4) according to claim 1, characterized in that the biasing means (64) have the intermediate element (78), via which the support leg (76) of the accordion spring (66) is indirectly supported or supportable on the clamping element (48).

5. The freewheel (4) according to claim 1, characterized in that the accordion spring (66) has a longitudinally extended spring base body (68), wherein the spring base body (68) is formed by a strip.

6. The freewheel (4) according to claim 1, characterized in that the spring support element (80) is arranged to be movable in the longitudinal spring direction (88, 90) along the opposing circumferential directions (24, 26) or guided on the first race (38) or on a component of the freewheel (4) connected rotationally fixed to the first race (38), where the freewheel (4) includes a side part (62) laterally delimiting the clamping gap (46) while supporting the spring support element (80) in the radial direction (20, 22), wherein the spring support element (80) is fixed on the intermediate element (78) or is designed as one piece with the intermediate element (78).

7. The freewheel (4) according to claim 6, characterized in that the spring support element (80) has a radially outward support wall (82) for supporting the at least one corrugation peak (70) and a diametrically opposite radially inward support wall (84) for supporting the at least one corrugation trough (72) which are connected to one another via a connection element (86), wherein the connection element (86) is formed by the intermediate element (78) and/or a side wall of the spring support element (80) arranged axially adjacent to the accordion spring (66).

8. The freewheel (4) according to claim 7, characterized in that the spring support element (80), the intermediate element (78) guided thereon, or the radially outer and inner support wall (82, 84) is designed as bent or curved.

9. The freewheel (4) according to claim 8, characterized in that a spring base body (68) of the accordion spring (66) is deformed in the region of support section (116) of the accordion spring (66) to increase the flexural strength of the support section (116), wherein at least one longitudinally extended, depression (118) is provided in the spring base body (68) in the region of the support section (116) of the accordion spring (66), the longitudinally extended depression (118) extends, centered, in an extension direction of the support section (116) of the accordion spring (66).

10. The freewheel (4) according to claim 6, characterized in that the biasing means (64) have at least one stop element (92, 94, 96, 98, 100) for supporting the spring support element (80) in the direction of the clamping element (48), wherein the stop element (92, 94, 96, 98, 100) functions between the first race (38), the component of the freewheel (4), the side part (62), or a projection (74), and the spring support element (80), or that the biasing means (64) have at least one stop element (120) for supporting the support section (116) of the accordion spring (66) in the direction of the clamping element (48), wherein the stop element (120) functions between the first race (38), or a component of the freewheel (4) connected rotationally fixed to the first race (38), where the freewheel (4) includes the side part (62) laterally delimiting the projection (74) on the first race (38), or the component, and the support section (116) of the accordion spring (66).

11. The freewheel (4) according to claim 1, characterized in that the spring support element (80) is formed by a support section (116) of the accordion spring (66), wherein the support section (116) of the accordion spring (66) extends to support the at least one corrugation peak (70) or the at least one corrugation trough (72) radially outside of the at least one corrugation peak (70) or radially inside of the at least corrugation trough (72), and is formed as an extension of the support leg (76).

12. The freewheel (4) according to claim 1, characterized in that the spring support element (80) and/or the intermediate element (78) is manufactured from plastic material.

13. The freewheel (4) according to claim 1, characterized in that the first race (38) is designed as an outer ring and the second race (40) is designed as an inner ring.

14. A freewheel arrangement (2) for a motor vehicle comprising:
the freewheel (4) according to claim 1;
a starter gear (32) which is connected rotationally fixed to the second race (40);
a drive output side (10) which is connected rotationally fixed to the first race (38); and
a starter motor (6) which is in permanent rotary driving engagement with the starter gear (32), wherein the second race (40) is rotatably supported directly or indirectly in the radial direction (20, 22) on the drive output side (10) or on a stationary housing (42) via a roller bearing or a slide bearing.

15. The freewheel (4) according to claim 1, wherein two or more corrugation peaks (70) directly following one another on the side of the accordion spring (66) facing the clamping element (48) are supported or supportable outwardly in the radial direction (20) on the spring support element (80).

16. The freewheel (4) according to claim 1, wherein two or more corrugation troughs (72) directly following one another on the side of the accordion spring (66) facing the clamping element (48) are supported or supportable inwardly in the radial direction (22) on the spring support element (80).

17. The freewheel (4) according to claim 1, characterized in that the spring support element (80) is formed by a rear support wall (106) facing away from the clamping element (48), via which rear support wall the accordion spring (66) is supported or supportable indirectly on the first race (38), and/or a side wall (108) of the spring support element (80) is formed, arranged axially adjacent to the accordion spring (66), wherein the spring support element (80) has an opening on the side diametrically opposite the side wall (108) in the axial direction (16).

18. A freewheel (4) comprising a first race (38), a second race (40), a clamping gap (46) designed between the first and second race (38, 40), at least one clamping element (48) in the clamping gap (46), and biasing means (64) for biasing the clamping element (48) into a clamping position within the clamping gap (46), wherein the biasing means (64) have an accordion spring (66), which is supported directly or indirectly on the first race (38) and which comprises corrugation peaks (70) lying radially outward, corrugation troughs (72) lying radially inward, and a support leg (76) for direct or indirect support on the clamping element (48), characterized in that the biasing means (64) have a spring support element (80) on which at least one of the corrugation peaks (70) is supported or supportable outwardly in radial direction (20) and/or at least one of the corrugation troughs (72) is supported or supportable inwardly in radial direction (22), wherein the spring support element (80) is arranged to be movable in the longitudinal spring direction (88, 90) along the opposing circumferential directions (24, 26) or guided on the first race (38) or on a component of the freewheel (4) connected rotationally fixed to the first race (38), where the freewheel (4) includes a side part (62) laterally delimiting the clamping gap (46) while supporting the spring support element (80) in the radial direction (20, 22), wherein the spring support element (80) is fixed on the intermediate element (78) or is designed as one piece with the intermediate element (78), wherein the spring support element (80) has a radially outward support wall (82) for supporting the at least one corrugation peak (70) and a diametrically opposite radially inward support wall (84) for supporting the at least one corrugation trough (72) which are connected to one another via a connection element (86), wherein the connection element (86) is formed by the intermediate element (78) and/or a side wall of the spring support element (80) arranged axially adj acent to the accordion spring (66), wherein the spring support element (80), the intermediate element (78) guided thereon, or the radially outer and inner support wall (82, 84) is designed as bent or curved, and wherein a spring base body (68) of the accordion spring (66) is deformed in the region of support section (116) of the accordion spring (66) to increase the flexural strength of the support section (116), wherein at least one longitudinally extended, depression (118) is provided in the spring base body (68) in the region of the support section (116) of the accordion spring (66), the longitudinally extended depression (118) extends, centered, in an extension direction of the support section (116) of the accordion spring (66).

* * * * *